US008359594B1

(12) United States Patent
Davidson et al.

(10) Patent No.: US 8,359,594 B1
(45) Date of Patent: Jan. 22, 2013

(54) AUTOMATED RAPID VIRTUAL MACHINE PROVISIONING SYSTEM

(75) Inventors: Thomas James Davidson, Austin, TX (US); Jonathan Mark Harper Nash, Oxfordshire (GB); Vasil Petrov Vasilev, London (GB)

(73) Assignee: Sychron Advanced Technologies, Inc., Austin, TX (US)

( * ) Notice: Subject to any disclaimer, the term of this patent is extended or adjusted under 35 U.S.C. 154(b) by 404 days.

(21) Appl. No.: 12/789,196

(22) Filed: May 27, 2010

Related U.S. Application Data

(60) Provisional application No. 61/221,765, filed on Jun. 30, 2009.

(51) Int. Cl.
G06F 9/455 (2006.01)

(52) U.S. Cl. ............ 718/1; 718/104; 717/100; 717/174; 717/126; 709/218; 709/224; 709/226

(58) Field of Classification Search .................. None
See application file for complete search history.

(56) References Cited

U.S. PATENT DOCUMENTS

| | | | | |
|---|---|---|---|---|
| 6,662,221 | B1* | 12/2003 | Gonda et al. ............... | 709/223 |
| 7,849,462 | B2* | 12/2010 | Traut et al. ................ | 718/1 |
| 7,890,951 | B2* | 2/2011 | Vinberg et al. ............ | 717/174 |
| 8,005,991 | B2* | 8/2011 | Lo et al. .................... | 709/248 |
| 8,122,116 | B2* | 2/2012 | Matsunaga et al. ......... | 709/223 |
| 8,176,486 | B2* | 5/2012 | Amir Husain ............ | 718/1 |
| 8,191,065 | B2* | 5/2012 | Frank ........................ | 718/1 |
| 2003/0144894 | A1* | 7/2003 | Robertson et al. .......... | 705/8 |
| 2006/0025985 | A1* | 2/2006 | Vinberg et al. ............ | 703/22 |
| 2006/0037002 | A1* | 2/2006 | Vinberg et al. ............ | 717/124 |
| 2006/0155674 | A1* | 7/2006 | Traut et al. ................ | 707/2 |
| 2006/0155735 | A1* | 7/2006 | Traut et al. ................ | 707/101 |
| 2007/0006218 | A1* | 1/2007 | Vinberg et al. ............ | 717/174 |
| 2007/0043860 | A1* | 2/2007 | Pabari ........................ | 709/224 |
| 2007/0300220 | A1* | 12/2007 | Seliger et al. ............. | 718/1 |
| 2008/0189700 | A1* | 8/2008 | Schmidt et al. ........... | 718/1 |
| 2008/0222234 | A1* | 9/2008 | Marchand .................. | 709/201 |
| 2008/0263553 | A1* | 10/2008 | Lueck et al. .............. | 718/102 |
| 2009/0260007 | A1* | 10/2009 | Beaty et al. ............... | 718/1 |
| 2009/0300608 | A1* | 12/2009 | Ferris et al. ............... | 718/1 |
| 2009/0327471 | A1* | 12/2009 | Astete et al. .............. | 709/223 |

OTHER PUBLICATIONS

Gupta, D. (2009). Scalable virtual machine multiplexing. University of California, San Diego). ProQuest Dissertations and Theses.*
McNett, Marvin. "Flexible and Efficient Resource Management in a Virtual Cluster Environment." University of California, San Diego, 2008. United States—California.*
Ruth, Paul M. "Adaptive Virtual Distributed Environments for Shared Cyberinfrastructures." Purdue University, 2007. United States—Indiana.*

(Continued)

Primary Examiner — Gurkanwaljit Singh
(74) Attorney, Agent, or Firm — Sprinkle IP Law Group

(57) ABSTRACT

Embodiments disclosed herein utilize Habitats to perform incremental updates on virtual machines (VMs) over time. A VM Habitat comprises a collection of VMs and a specification shared between these VMs. Each Habitat specification may define an image name, processing power, etc. A Habitat specification may exist across a cluster of servers. In some embodiments, to dynamically update a Habitat specification, only "spare" VMs in the Habitat are updated, subject to some scheduling parameters and server concurrency limit. As spare VMs are updated, they move towards the new Habitat specification. Eventually, all VMs reach this goal over time, given sufficient spare VM resources. This approach can allow the service provided by the VMs to remain operational, thus maintaining the service level required for its users. This automated process can also eliminate or otherwise reduce human error either in the server removal/insertion from/to the cluster or in the VM update itself.

20 Claims, 11 Drawing Sheets

OTHER PUBLICATIONS

Decision Support for Virtual Machine. Re-Provisioning in Production Environments. Kyrre Begnum and Matthew Disney—Oslo University College, Norway—21st Large Installation System Administration Conference (LISA 2007).*

Begnum, K.; Burgess, M.; Sechrest, J.; , "Adaptive provisioning using virtual machines and autonomous role-based management," Autonomic and Autonomous Systems, 2006. ICAS '06. 2006 International Conference on , vol., No., pp. 7, Jul. 16-18, 2006.*

Managing Large Networks of. Virtual Machines. Kyrre M Begnum—Oslo University College, Norway, Proceeding LISA '06 Proceedings of the 20th conference on Large Installation System Administration pp. 16-16 USENIX Association Berkeley, CA, USA copyright 2006.*

Ahmed A. Soror and Umar Farooq and Minhas Ashraf Aboulnaga and Kenneth Salem and Peter Kokosielis and Sunil Kamath "Automatic virtual machine configuration for database workloads" SIGMOD'08, Jun. 9-12, 2008, Vancouver, BC, Canada. Copyright 2008 ACM 9781605581026/ Aug. 2006.*

Shivam, Piyush et al., "Automated and on-demand provisioning of virtual machines for database applications" SIGMOD'07, JProceedings of the 2007 ACM SIGMOD international conference on Management of data pp. 1079-1081.*

Krsul, I.; Ganguly, A.; Jian Zhang; Fortes, J.A.B.; Figueiredo, R.J.; , "VMPlants: Providing and Managing Virtual Machine Execution Environments for Grid Computing," Supercomputing, 2004. Proceedings of the ACM/IEEE SC2004 Conference , vol., No., pp. 7, Nov. 6-12, 2004.*

Virtualizing I/O Devices on VMware Workstation's. Hosted Virtual Machine Monitor. Jeremy Sugerman, Ganesh Venkitachalam and Beng-Hong Lim. VMware, Inc Jun. 24, 2001.*

Rosenblum, Mendel, "The Reincarnation of Virtual Machines," QUEUE, Jul./Aug. 2004, pp. 34-38.

"Live Migration with AMD-V™ Extended Migration Technology," AMD White Paper, 2007, downloaded May 3, 2010 from <http://www.amd.com>, 8 pages.

* cited by examiner

AUTOMATED RAPID VIRTUAL MACHINE PROVISIONING SYSTEM

CROSS-REFERENCE TO RELATED APPLICATIONS)

This is a conversion of and claims the benefit of priority from Provisional Application No. 61/221,765, filed Jun. 30, 2009, entitled "AUTOMATED RAPID VIRTUAL MACHINE PROVISIONING SYSTEM," which is fully incorporated herein by reference, including appendices or attachments thereof.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present application relates generally to virtual machines and, more particularly, to rapid deployment of virtual machines utilizing virtual machine habitats with automated goal-oriented multi-step provisioning.

DESCRIPTION OF THE BACKGROUND ART

A virtual machine (VM) is a computer-generated machine that exists in a virtual world and that functions like a physical machine, including running its own applications and operation system (OS). A VM is composed of software and contains no hardware components. However, each VM generally has software-based components that correspond to hardware components of a physical machine. For example, in addition to the application and OS layers, a VM usually has a resource layer comprising resources such as a virtual central processing unit (CPU), a virtual random access memory (RAM), a virtual hard disk (HD), a virtual network interface card (NIC), and so on, much like a typical data processing system or computer.

Today, multiple VMs may run on a single physical machine and share the underlying physical machine resources. Since each VM may run its own OS in an isolated computing environment, multiple OS environments can co-exist on the same computer. The software layer providing the virtualization is called a virtual machine monitor or manager (VMM). Using a VMM, virtual machines can be provisioned, replicated, and migrated from one physical machine to another. However, current approaches of provisioning/re-provisioning virtual machines (VMs) can be slow, error prone, disruptive to services, and difficult to scale. For example, to perform an action such as software update on a group of virtual machines, one approach involves stopping service(s) provided by this virtual machine and taking the server machine hosting the virtual machine offline in order to manually update the virtual machine. This approach can be quite disruptive to the service(s) provided by the virtual machine and therefore is neither practical nor desirable. As the complexity of VM systems continues to increase, there is always room for improvements.

SUMMARY OF THE DISCLOSURE

Embodiments disclosed herein provide an automated VM provisioning system that takes a goal-oriented, autonomous approach to VM provisioning. More specifically, embodiments disclosed herein utilize VM Habitats to perform incremental updates on VMs over time. Within this disclosure, a VM Habitat comprises a collection of VMs and a common specification shared between these VMs. Each Habitat specification may define an image name, processing power, etc.

A Habitat specification may exist across a server cluster which may have one or more servers. In some embodiments, a server machine may operate to support from a few to a hundred or more VMs. In some embodiments, to dynamically update a Habitat specification, only "spare" VMs in the Habitat are updated. As spare VMs are updated, they move towards the new Habitat specification. Eventually, all VMs reach this goal over time, given sufficient spare VM resources. In this way, no service would have to be brought down for upgrade. This approach can allow the service provided by the VMs to remain operational, thus maintaining the service level required for its users, while at the same time the VMs are incrementally moved to their new Habitat specification. This automated process can also eliminate or otherwise reduce human error either in the server removal/insertion from/to the cluster or in the VM update itself.

In some embodiments, a method for updating virtual machines may comprise, at each server machine in a server cluster, periodically analyzing a local list of virtual machines for a Habitat, placing all, some, or none of the virtual machines into a plurality of buckets, and processing the plurality of buckets per server machine in the server cluster to incrementally update any virtual machine placed therein, subject to a server concurrency limit and scheduling parameters of the specification. The server concurrency limit specifies a maximum number of updates that are allowed by the server machine to be performed on its virtual machines at any time. The scheduling parameters include a minimum number and a maximum number of spare virtual machines that are available to end users.

In some embodiments, the Habitat may comprise a single image and a single specification. The virtual machines are provisioned from the image according to the specification. In some embodiments, the plurality of buckets may comprise a soft bucket, a hard bucket, a reprovision bucket, and a repopulate bucket.

In some embodiments, for any virtual machine placed in the soft bucket, a parameter of the virtual machine can be updated while the virtual machine is running; for any virtual machine placed in the hard bucket, the virtual machine needs to be stopped before the parameter is to be updated; for any virtual machine placed in the reprovision bucket, the virtual machine must be deleted and recreated; and a virtual machine is placed in the repopulate bucket if the server machine decides to delete this virtual machine.

Depending upon the types of updates, it is possible for multiple virtual machines to be simultaneously placed in multiple buckets. For example, a memory update and a processing power update to the specification may cause all the virtual machines in a given Habitat to be simultaneously placed in the soft bucket and the hard bucket. For an image update, all the virtual machines may be placed in the reprovision bucket.

In some embodiments, each of the virtual machines is in an available, assigned, or stopped state. In some embodiments, the processing is performed by a central update process, located on a server within the cluster or with access to the cluster. The process may periodically run to perform the following:

if no virtual machines are in the plurality of buckets and a change in the specification indicates that more virtual machines can be supported on the server machine, creating one or more virtual machines for the server machine;

deleting any virtual machine that is stopped and that is in the repopulate bucket;

updating any virtual machine that is stopped and that is in the reprovision bucket;

updating any virtual machine that is stopped and that is in the hard bucket;

updating any virtual machine that is available and that is in the repopulate bucket;

updating any virtual machine that is available and that is in the reprovision bucket;

updating any virtual machine that is available and that is in the hard bucket; and updating any virtual machine that is in the soft bucket.

In this way, virtual machines can be incrementally updated to meet the current Habitat specification. In every stage of the update process, the minimum number of available virtual machines is maintained. This allows users to log in and out of virtual machines while the central update process performs incremental updates on them. Accordingly, the user service levels can also be maintained. Further, performing incremental updates in this manner does not invalidate the server concurrency limits.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 7A-E show by example how virtual machines of a Habitat can be reprovisioned incrementally utilizing multiple buckets;

DETAILED DESCRIPTION

Figure 1:
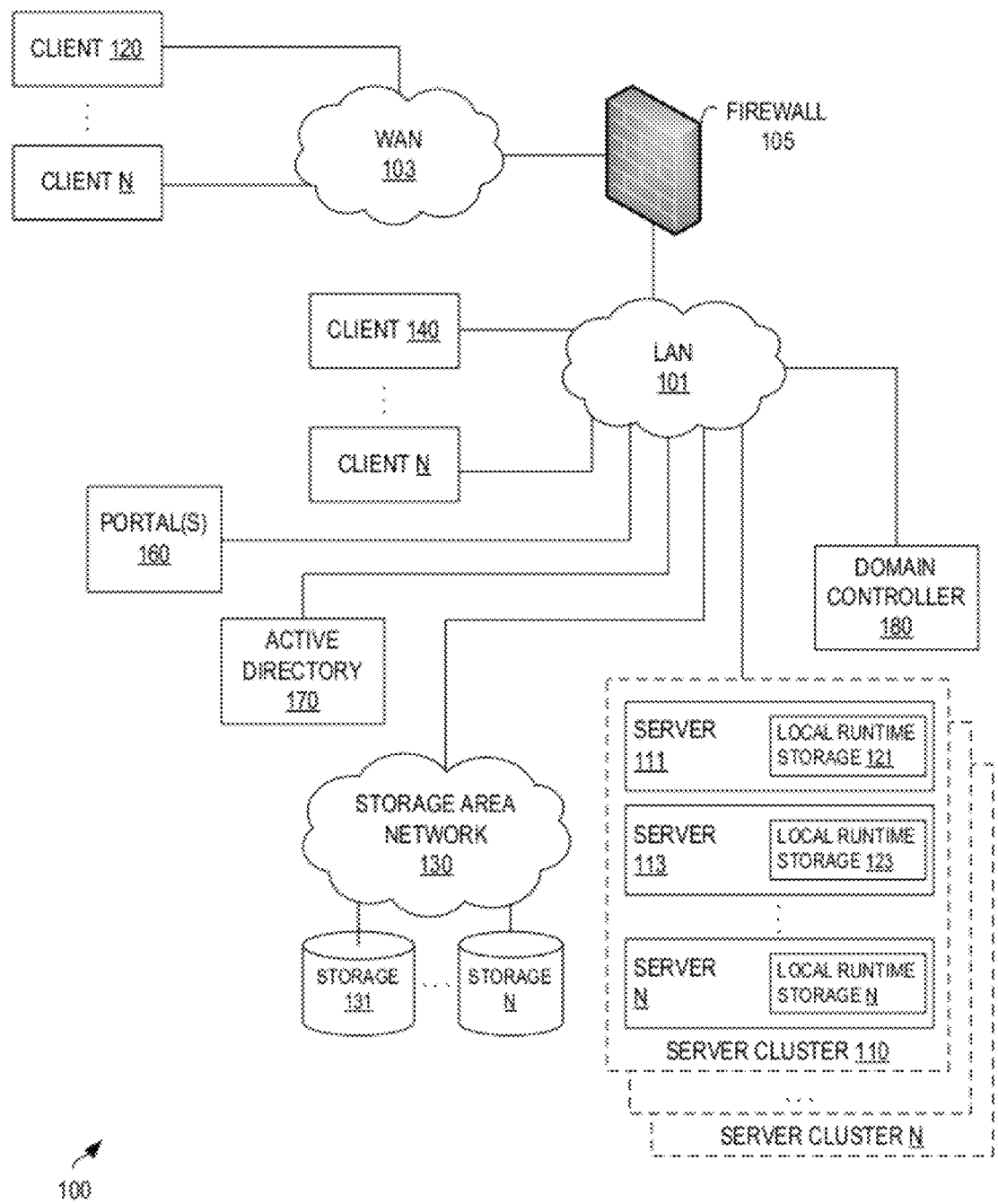
FIG. 1 depicts a diagrammatic representation of an example network architecture in which embodiments disclosed herein may be implemented.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on one or more computer-readable storage media. Within this disclosure, the term "computer-readable storage media" encompasses all types of non-transitory data storage media that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As illustrated in FIG. 1, embodiments disclosed herein may be implemented in network environment 100 having Local Area Network (LAN) 101 connected to Wide Area Network (WAN) 103 via Firewall 105. LAN 101 may have local clients 140 . . . N and remote clients 120 . . . N. Web server(s) hosting portal(s) 160 may reside on LAN 101 and operate to serve client requests and, in some embodiments, to administer server clusters 110 . . . N. Domain Controller 180 on LAN 101 may allow a VM in network environment 100 to join a Windows domain and obtain an IP address when the VM is booted up. In some embodiments, Active Directory 170 on LAN 101 may enable portal(s) 160 to validate a user's credentials, submitted via one of clients 120 . . . N or clients 140 . . . N, before the user can connect to a VM. In addition to server clusters 110 . . . N, LAN 101 may comprise Storage Area Network 130 having data storage devices 131 . . . N for storing user data. As an example, user data may comprise user profile data and user documents. Server cluster 110 may comprise a plurality of servers 111, 113, . . . N, each having a local runtime storage device, such as storage 121, storage 123, etc. As an example, storage 121 may store an image of a VM and snapshots thereof taken at different stages.

Figure 2:
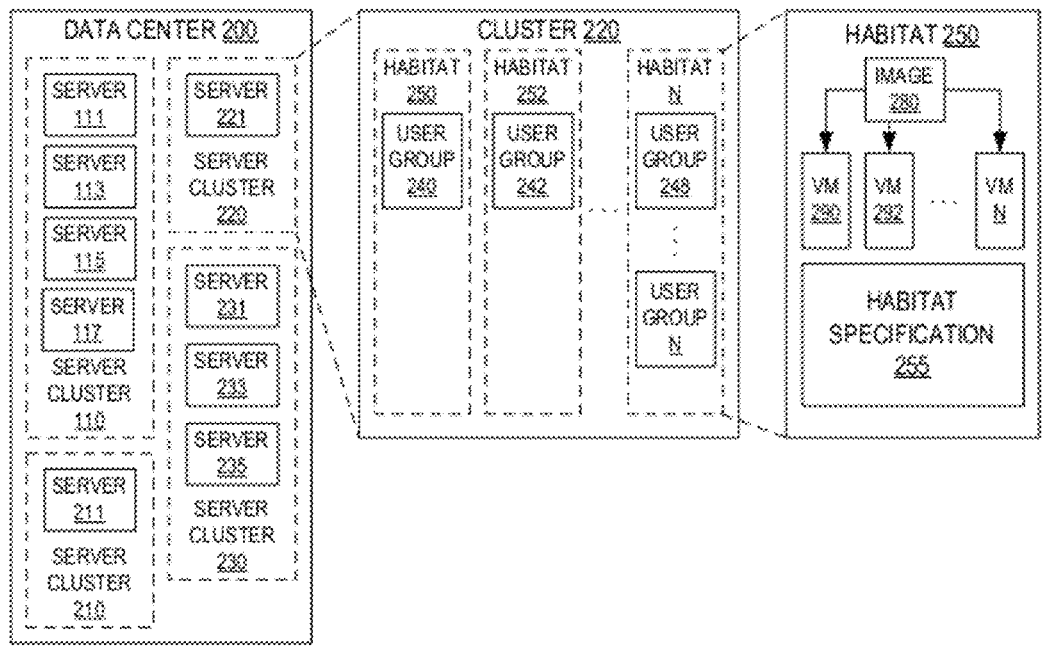
FIG. 2 depicts a high-level block diagram illustrating an example system for automated rapid virtual machine provisioning utilizing goal-oriented incremental updates for a given Habitat.

FIG. 2 depicts a high-level block diagram illustrating by example an automated rapid virtual machine provisioning system having one or more server clusters. Each server cluster may comprise one or more server machines and may support zero or more VM Habitats. Each Habitat may comprise one or more VMs and may support zero or more user groups. A Habitat may have a single image and a single specification that can be applied to all of the virtual machines in that Habitat. In some embodiments, a single server may support a Habitat of multiple virtual machines.

In the example of FIG. 2, Data Center 200 comprises server cluster 110, 210, 220, 230. Server cluster 110 may comprise servers 111, 113, 115, 117. Server cluster 210 may comprise server 211. Server cluster 220 may comprise server 221. Server cluster 230 may comprise servers 231, 233, 235. As an example, cluster 220 may support Habitat 250, 252, . . . , N. Habitat 250 may support User Group 240. Habitat 252 may support User Group 242. Habitat N may support User Group 248, . . . , User Group N. As an even more specific example, Habitat 250 may comprise a plurality of VMs such as VM 290, VM 292, . . . VM N, all of which are provisioned from image 280 based on Habitat specification 255.

Within this disclosure, a Habitat specification defines a collection of common VMs that run across one or more servers in a cluster. As described below, a Habitat specification may define parameters and policies applicable to all the VMs in a Habitat. Over time, an authorized user such as a system administrator may change this specification. For example, one might change the specification to vary the server resources consumed by each VM or to apply a new VM image with updated security patches. In some embodiments, a Habitat specification can be divided into a number of distinct areas:

Scheduling Parameters:
Priority: the relative priority of the Habitat in the cluster, which can be used to order the Habitats when VMs are evaluated for updates.
Min, max: the minimum and maximum number of VMs in the Habitat that should be running at any given time.
Low, high: the lower and upper limits on the number of VMs that should be running and available for new users at any given time. These provide a level of hysteresis, so that VMs are not being turned on and off more frequently than needed.

VM Image Parameters:
Image: the master image used to create the VMs in the Habitat.
Template: a template for the procedure to create a VM, which can be tailored for each VM (e.g., a Windows sysprep file in which the name of the VM can be varied).
Destination: the repository for the individual VMs that are created as a result.

VM Non-Resource Parameters:
Windows domain: the domain for a Windows-based VM to join.
Virtual network: the virtual network name to which the VM should bind.

VM Resource Parameters:
Processing power: definition may just be a scalar MHz rating or a MHz and number of cores pair, for an SMP-based VM.
Memory: a memory requirement in megabytes.
Other parameters can include network bandwidth and disk rate access, etc.

In some embodiments, a single process may control changes and/or updates to a server cluster. The scheduling parameters above can be used by this process, referred to herein as a central update process, to control which VMs are turned on and off in order to satisfy the min, max, low, and high Habitat parameters and what Habitat order the priority parameter defines. In some embodiments, these same parameters can also be used to gauge the degree of spare VMs, which can be updated to align with any new Habitat specification. For example, if the low parameter is set to 15, but there are currently 25 VMs available in the cluster for new users, in this non-limiting example, 10 VMs can be updated without invalidating the required service level.

In some embodiments, a server may also provide a hint as to how many current updates it can support without stretching its resource capabilities. Disk access is an example of a typical resource which can be expensive. Following the previous non-limiting example where 10 VMs can be updated, if a cluster has two servers with respective update limits of 3 and 4 VMs, that number would be reduced from 10 to 7 VMs to update, assuming that no current updates are still taking place on the servers. In some embodiments, a server may also supply limits on the number of VMs that can be started and stopped at any one time, again to protect the server.

Given a current Habitat specification and a collection of VMs in the cluster belonging to this Habitat, embodiments disclosed herein can update these VMs incrementally so that over time, they align with the current Habitat specification. In some embodiments, in order for a central update process to perform these updates, each server may periodically analyze its local list of VMs for a given Habitat and place them into four categories, or "buckets:"

Soft:
A VM is placed in this bucket if the VM parameter can be updated while it is running. In some embodiments, this applies to the Habitat VM resource parameter for processing power (or disk/network bandwidth).

Hard:
A VM is placed in this bucket if the VM needs to be stopped before the parameter can be updated. For example, a VM may be placed in this bucket before the Habitat VM resource parameter for memory or for the Habitat VM non-resource parameter for the virtual network name can be updated.

Reprovision:

A VM is placed in this bucket if the VM must be deleted and recreated. This applies to the Habitat VM image parameters and to the Habitat VM non-resource parameter for Windows domain.

Repopulate:

A VM is placed in this bucket if the server decides that it would like to delete this VM. In some embodiments, the choice of VM could be non-deterministic or follow a more strategic approach. For example, an increase in the Habitat VM resource parameters means that the server will be able to support fewer VMs. The number of VMs on the server must therefore be reduced before the remaining VMs can be updated; otherwise, some or all of the updated VMs will not be able to be turned on because of the server resource limits.

Figure 3:
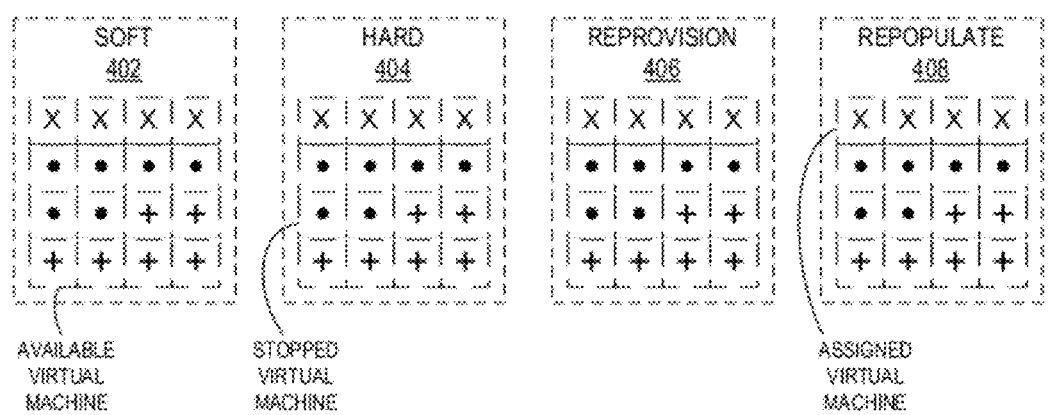
FIG. 3 depicts a diagrammatic representation of one embodiment of a goal-oriented VM provisioning approach comprising multiple categories or "buckets" for holding virtual machines in different states.

An example set of buckets is illustrated in FIG. 3. In the non-limiting example of FIG. 3, each of the four buckets 402, 404, 406, and 408 may hold up to 16 VMs. Those skilled in the art can appreciate that these buckets may be configured or otherwise adapted to hold a different number of VMs.

It's possible for a VM to be in multiple buckets simultaneously. For example, a VM may be in the Soft bucket because of a processing power change, in the Hard bucket for a memory change, in the Reprovision bucket as its image needs to be changed, and also in the Repopulate bucket because it needs to be deleted before the resources of the remaining VMs can be raised. These buckets may hold VMs in different states. In some embodiments, a VM may be in an assigned, stopped, or available state.

After populating the buckets, a server stamps the buckets with the revision number of the Habitat specification. The Habitat revision number is incremented each time a change in the specification is carried out. This enables the central update process to validate that the buckets represent the changes required for the current Habitat specification.

In some embodiments, the single update process periodically runs within the cluster in order to perform VM updates. An orthogonal process may determine which VMs to turn on and off in order to maintain the scheduling requirements of a Habitat.

Figure 4:
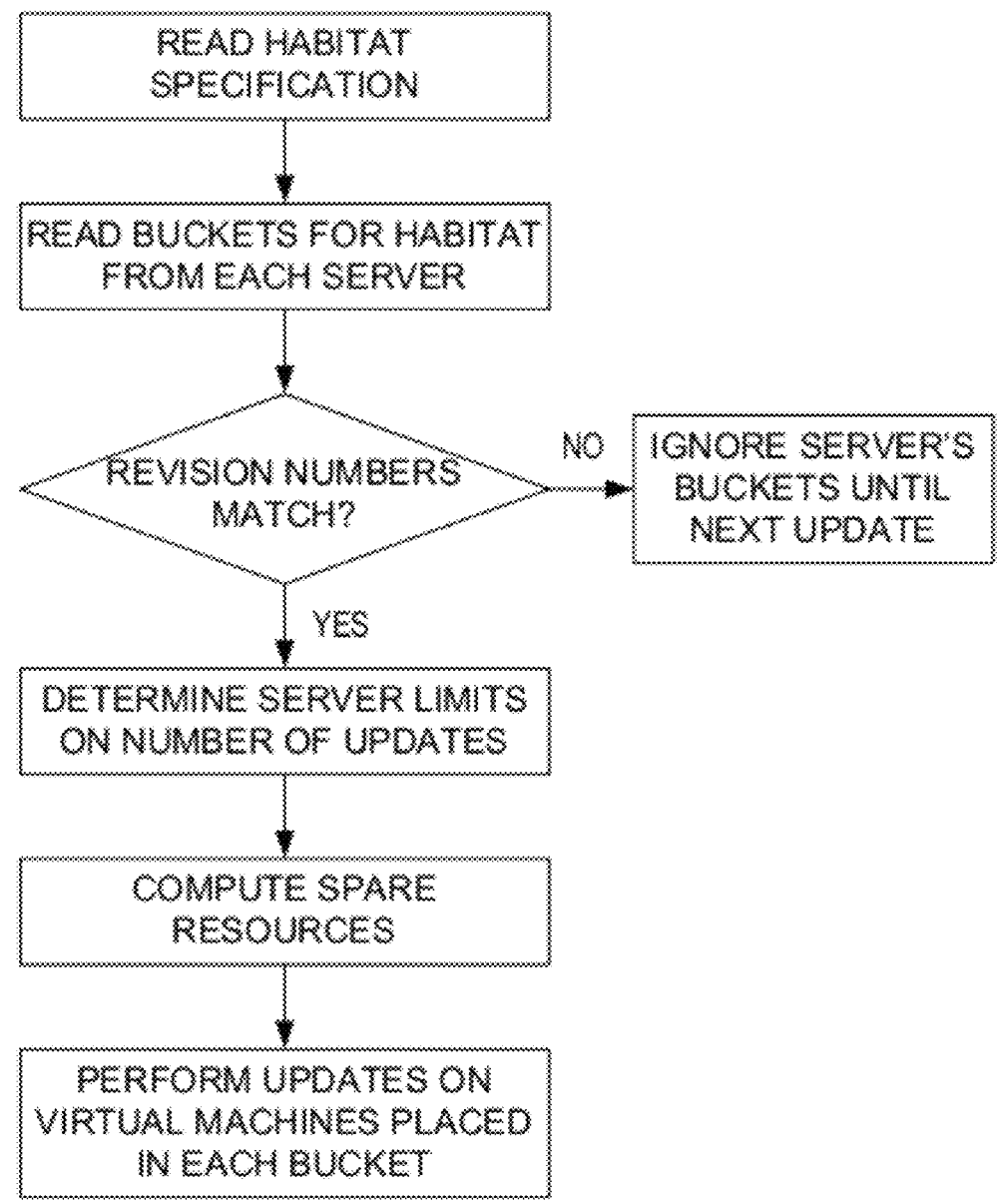
FIG. 4 depicts a flow diagram illustrating one embodiment of a goal-oriented VM provisioning method.

FIG. 4 depicts a flow diagram illustrating one embodiment of a goal-oriented VM provisioning method comprising central update process 400, running either on a server within the cluster or on a server with cluster access. In some embodiments, a method implementing process 400 for updating virtual machines in a given Habitat may comprise:

Read the Habitat specification, including its revision number, which is stored as part of the buckets structure on each server.

Read the buckets for the Habitat from each server, and validate the revision number of the buckets against the Habitat revision number. If they don't match, this server's buckets will be ignored until the next update takes place.

Read any limits on the number of outstanding updates allowed on each server.

Compute the spare resources from the current cluster state and the Habitat specification. For example, the Habitat specification scheduling parameter "low" may be compared with the actual number of VMs available for new users.

In accordance with the current Habitat specification, perform incremental updates per server on VMs placed in each bucket. In some embodiments, process 400 may perform in the following order:

Empty Buckets:

If the buckets are all empty for a given server, and a change in Habitat specification (e.g., a reduction in memory) means that more VMs can be supported on this server, more VMs can be created at this point.

Repopulate Bucket (Stopped VMs):

If the change in Habitat specification (e.g., an increase in memory) means that fewer VMs can be supported on some servers, VMs will be deleted on these servers if a VM is stopped. After the VMs on a given server are all deleted, its remaining VMs in the Soft, Hard or Reprovision buckets can be updated over time.

Reprovision/Hard Buckets (Stopped VMs):

For any stopped VMs on each server, perform Reprovision/Hard updates, subject to the limitations of the number of pending updates and subject to the Repopulate bucket on the server being empty.

Repopulate/Reprovision/Hard Buckets (Spare VMs):

Given any spare capacity within the Habitat, again perform Repopulate/Reprovision/Hard updates, as described above, subject to the same pending updates limitation. The Repopulate bucket takes precedence and again must be empty in order for other updates to progress.

Soft Buckets:

Perform any Soft updates on running or stopped VMs, again subject to the per-server limitation on the number of pending updates and subject to the Repopulate bucket on the server being empty.

An optimization of this approach is to aim to preserve the consecutive index numbers of the VMs when the number of VMs is reduced on a server. For example, if a server is initially populated with five VMs for a given Habitat, and the server internally references each of these VMs using the indexes 1, 2, 3, 4, 5, then when the number of VMs are reduced to three, it might be advantageous to maintain this consecutive numbering (i.e., 1, 2, 3, rather than 1, 3, 4). This would allow a single scalar to be used to represent the number of VMs on a given server—in this example, three—rather than the use of a list. Using a single scalar can have benefits in the allocation of static IP and/or MAC addresses across the VMs in the cluster.

To support this optimization, the servers can place specific VMs into the Repopulate bucket, where VMs with highest index numbers are placed in this bucket when a server needs to reduce the number of VMs it can support. One example of this is described below with reference to FIGS. 6A-B.

The central update process, in addition to performing VM updates, can make a more informed decision as to which VMs to turn on and off in order to meet the scheduling parameters (min, max, low, high) of the Habitat specification. In some embodiments, the central update process may perform the following:

Deciding which VMs to Start:

Avoid those high index number VMs for a given server if its Repopulate bucket is not empty. For example, if the bucket contains VMs with Indices 4 and 5, favor starting VMs 1, 2, 3. If the min or low scheduling parameters of the Habitat specification mean that more VMs need to be started, then VMs 4 and 5 may need to be turned on. In some embodiments, it may be a decision between fulfilling the scheduling parameters by starting these VMs and fulfilling the VM resource parameters by leaving them turned off so that they can be deleted at some point.

Deciding which VMs to Stop:

Favor high index number VMs for a given server if its Repopulate bucket contains these VMs. For example, if the bucket contains VMs with Indices 4 and 5, favor stopping these VMs.

EXAMPLES

The following examples provide an overview for each type of bucket held on a server, assuming a cluster containing a single server. For the purpose of illustration and not of limitation, these examples further assume that a VM update taking place in one update cycle will complete before the next cycle begins and that the deletion of a VM is not counted towards the number of outstanding updates on a server.

Referring to FIG. 3, "+" denotes a VM that is available for a new user, "●" denotes a VM that is stopped (i.e., no user is currently assigned to the VM), and "X" denotes a VM that is assigned to a user. In some embodiments, each server supports four bucket types for each Habitat. In these non-limiting examples, the server has 2 GHz CPU with 4 GB memory, initially supports up to 16 VMs with the original Habitat specification, and allows up to five changes to be made at the same time (i.e., concurrency limit is 5). FIG. 3 shows buckets 402, 404, 406, and 408 where 16 VMs (indexed from 1 to 16) may potentially be placed. The single Habitat specification in these examples initially specifies 100 MHz CPU with 256 MB memory.

Example 1

Increasing Habitat Memory and Processing Power

Figures 5, 6A:
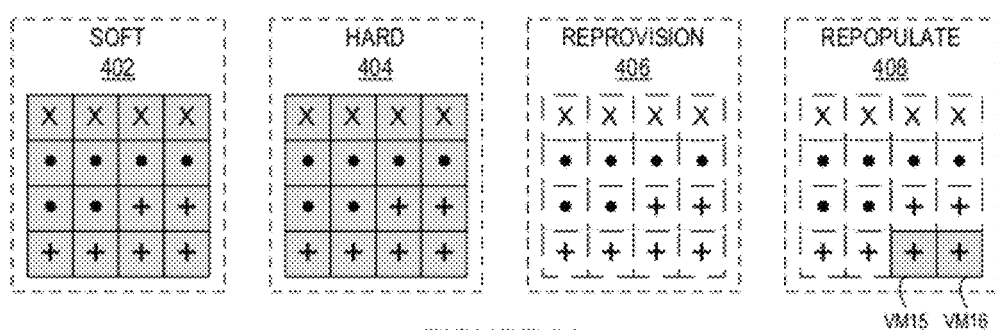
FIG. 5 is a screenshot of one embodiment of a user interface illustrating example changes made to a Habitat specification.
FIGS. 6A-F show by example how virtual machines of a Habitat can be provisioned incrementally utilizing multiple buckets.

FIG. 5 is a screenshot of one embodiment of user interface 500 illustrating example changes made to a Habitat specification. In one embodiment, user interface 500 may be implemented as a portal page on portal(s) 160. In this example, Resources 510 shows that the processing power is increased from 100 MHz to 110 MHz for the Habitat specification VM resource parameter "CPU (MHz)" and the memory size is increased from 256 MB to 288 MB for the Habitat specification VM resource parameter "Memory (MB)".

As illustrated in FIG. 6A, the change in the processing power causes VMs 1-16 to be placed into Soft bucket 402 (and thus are shaded in FIG. 6A) because the "CPU (MHz)" parameter can be updated while it is running. Simultaneously, the change in the Habitat memory size causes VMs 1-16 to be placed into Hard bucket 404 because the VMs would need to be stopped before the "Memory (MB)" parameter can be updated. No VMs are in Reprovision bucket 406 because the VMs do not need to be recreated for these particular updates.

Figure 6B:
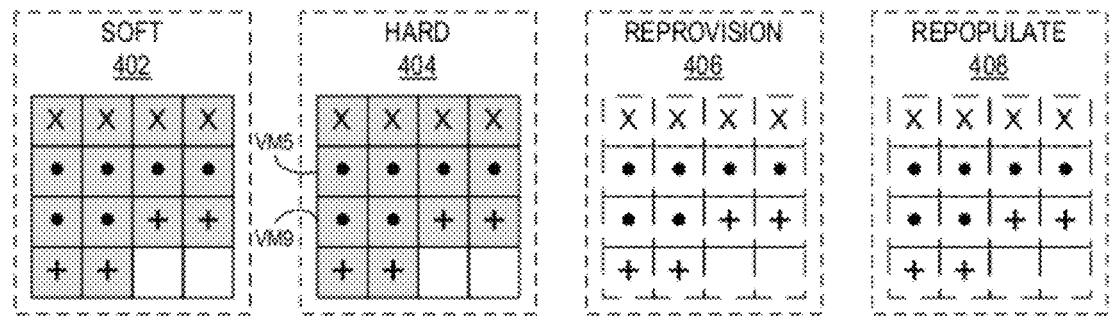

Due to the memory increase in Habitat specification, the server can now only support 14 VMs, which means VMs 15 and 16 would need to be deleted to support the higher resource requirements of the remaining VMs. The server only places VMs 15 and 16 in Repopulate 408 to preserve contiguous indices in this example. FIG. 6B shows that Repopulate 408 has been emptied (see process 400 described above), so other updates can continue.

Figure 6C:
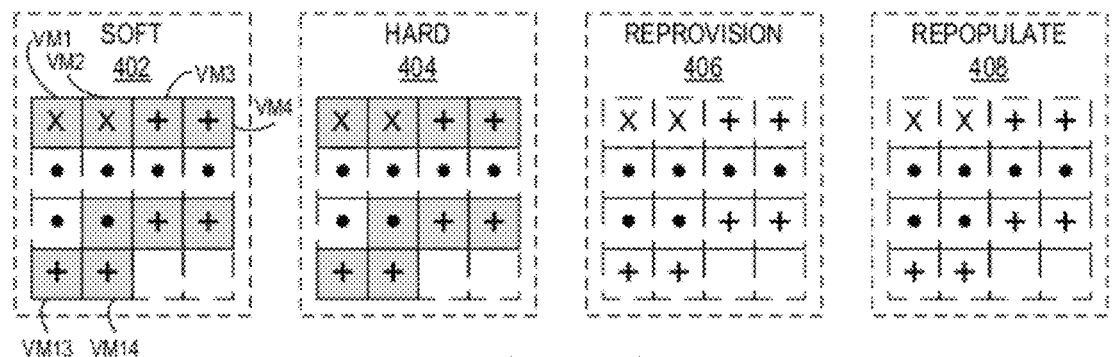

FIG. 6C shows that stopped VMs 5-9 are updated next. Stopped VM 10 is not yet updated because the maximum concurrency limit of 5 has been reached. FIG. 6C also shows that users logged out of VMs 3 and 4, making them available again.

Figure 6D:
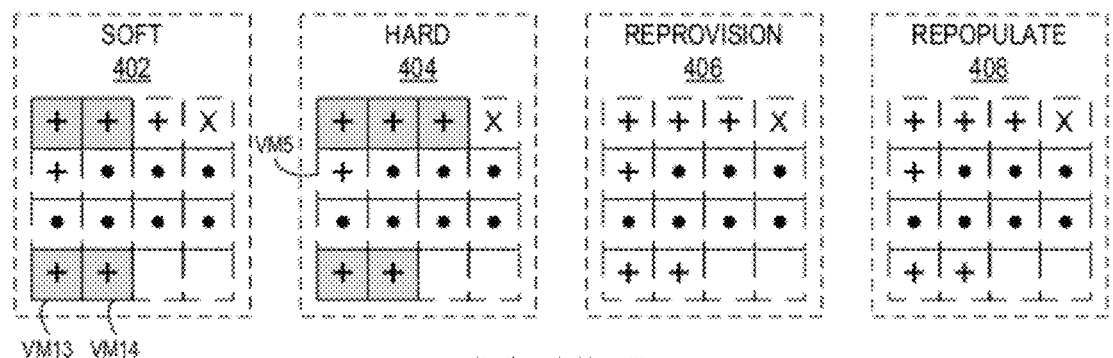

FIG. 6D shows the next update which involves updating stopped VM 10 as well as available (spare) VMs 4, 11, 12. In some cases, the server may randomly choose spare VMs to update, subject to the per-server limitation on the number of pending updates and subject to Repopulate bucket 408 being empty as described above with regard to central update process 400. FIG. 6D also shows that users logged out of VMs 1 and 2, making them available again, and users logged into VM 4, changing VM 4 to assigned state. In FIG. 6D, the processing power and memory updates on VM 5 have been completed, so VM 5 is available again. VM 3 in Soft bucket 402 can be updated to increase the processing power while it is running. Once this update is complete, VM 3 is removed from Soft bucket 402. VM 3 remains in Hard bucket 404 until it can be stopped to perform the memory update.

Figure 6E:
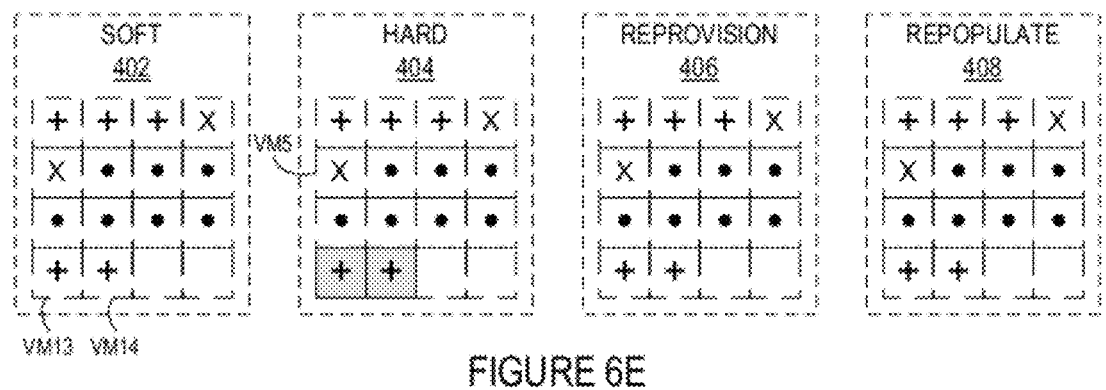

FIG. 6E shows users logged into VM 5, changing VM 5 to assigned state. In FIG. 6E, the processing power and memory updates on VMs 1-3 have been completed, so they are available again. VMs 13 and 14 in Soft bucket 402 can be updated to increase the processing power while they are running and are removed from Soft bucket 402 when this update is done. VMs 13 and 14 remain in Hard bucket 404 until they can be stopped to perform the memory update.

Figure 6F:
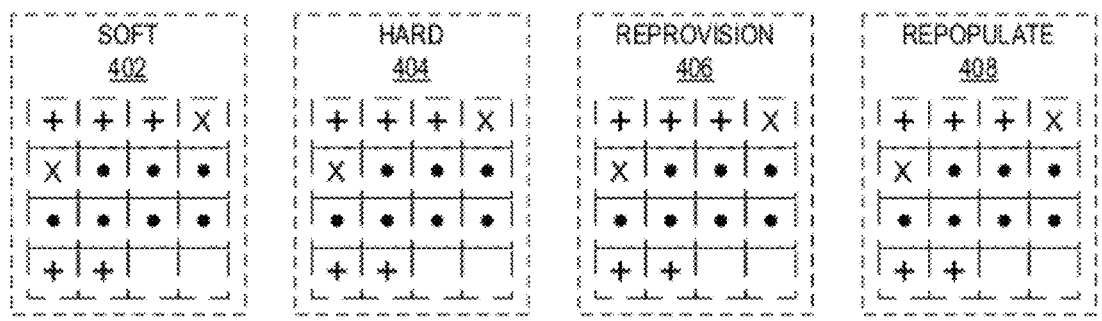

FIG. 6F shows that all VMs have been updated to meet the current Habitat specification. In this example, in every stage of the update process, a minimum of three spare VMs is maintained. Users can log in and out of VMs while the central update process performs incremental updates on them. Accordingly, the user service levels were also maintained. Further, as exemplified above, performing incremental updates in this manner does not invalidate the server concurrency limits.

Example 2

Updating Habitat Image file

FIGS. 7A-E show by example how virtual machines of a Habitat can be reprovisioned incrementally utilizing multiple buckets. In some embodiments, a change in a Habitat specification may cause one or more VMs in the Habitat to be reprovisioned. For example, a change in the VM image will cause all the VMs in the Habitat to be placed into the Reprovision bucket. Some of the VMs may be put into the Repopulate bucket, since they may need to be deleted to support the higher resource requirements of the remaining VMs.

Figures 7A, 7B, 7C:
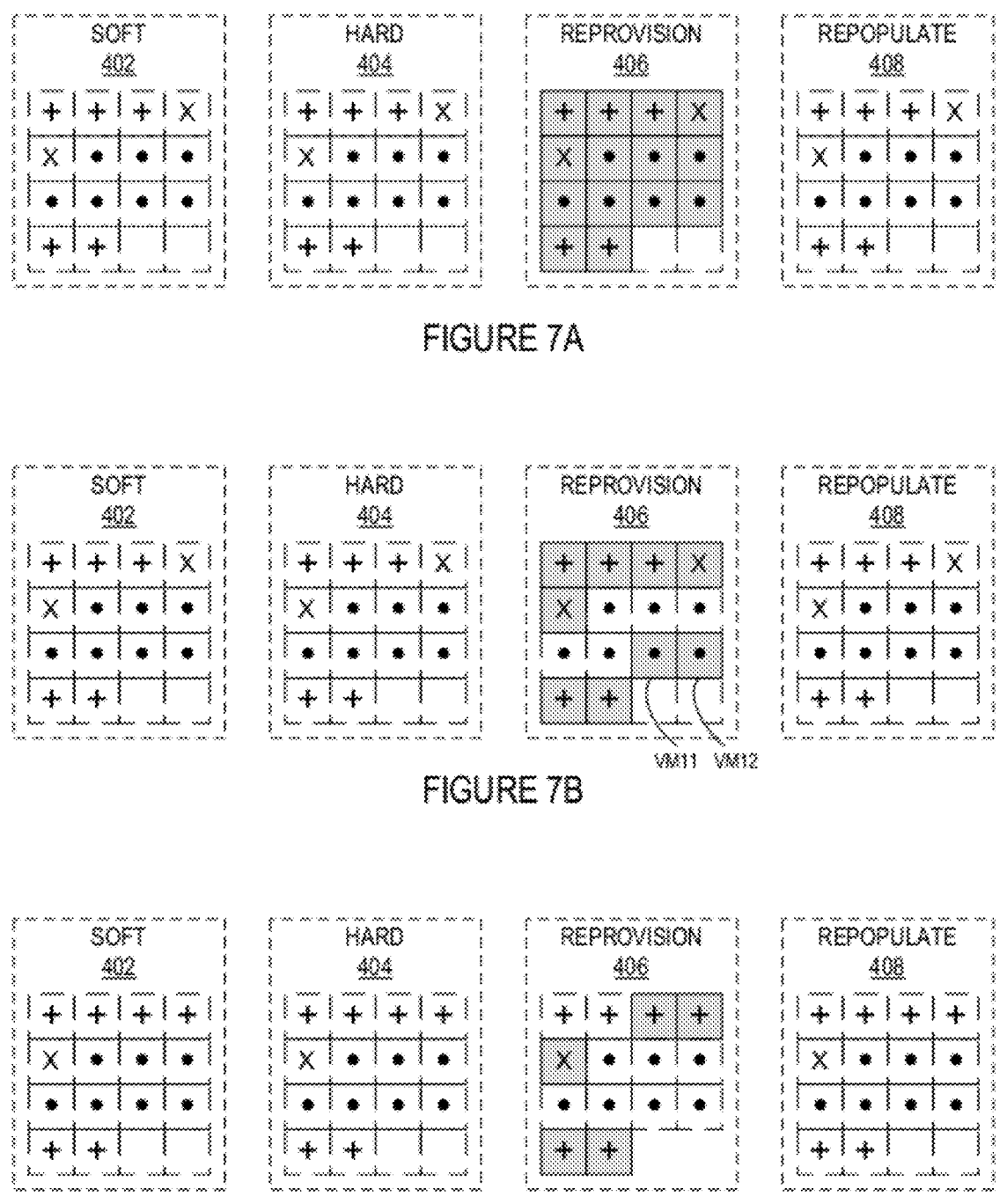

As illustrated in FIG. 7A, a change in the VM image causes all 14 VMs from FIG. 6F to be placed into Reprovision bucket 406. Since VMs 6-12 are currently stopped, they can be updated first. To meet the server concurrency limit of five (the maximum number of actions allowed by the server to take place at the same time), only stopped VMs 6-10 are recreated and removed from Reprovision bucket 406 thereafter, as shown in FIG. 7B.

FIG. 7C shows that stopped VMs 11 and 12 and spare VMs 1 and 2 are updated next and removed from Reprovision bucket 406 thereafter. To maintain the minimum available (spare) VMs of three, no more spare VM is updated, even though the number of actions performed is less than the server concurrency limit of five. Subsequently, user(s) logged out of VM 4, making it available again. So, in FIG. 7C, VMs 3, 4, 5, 13, and 14 still need to be reprovisioned. Since VMs 1 and 2 are available, VM 5 is assigned, and VMs 6-12 are stopped, spare VMs 3, 4, and 14 are randomly chosen for image update, leaving spare VMs 1, 2, and 13 available for users to use.

Figures 7D, 7E:
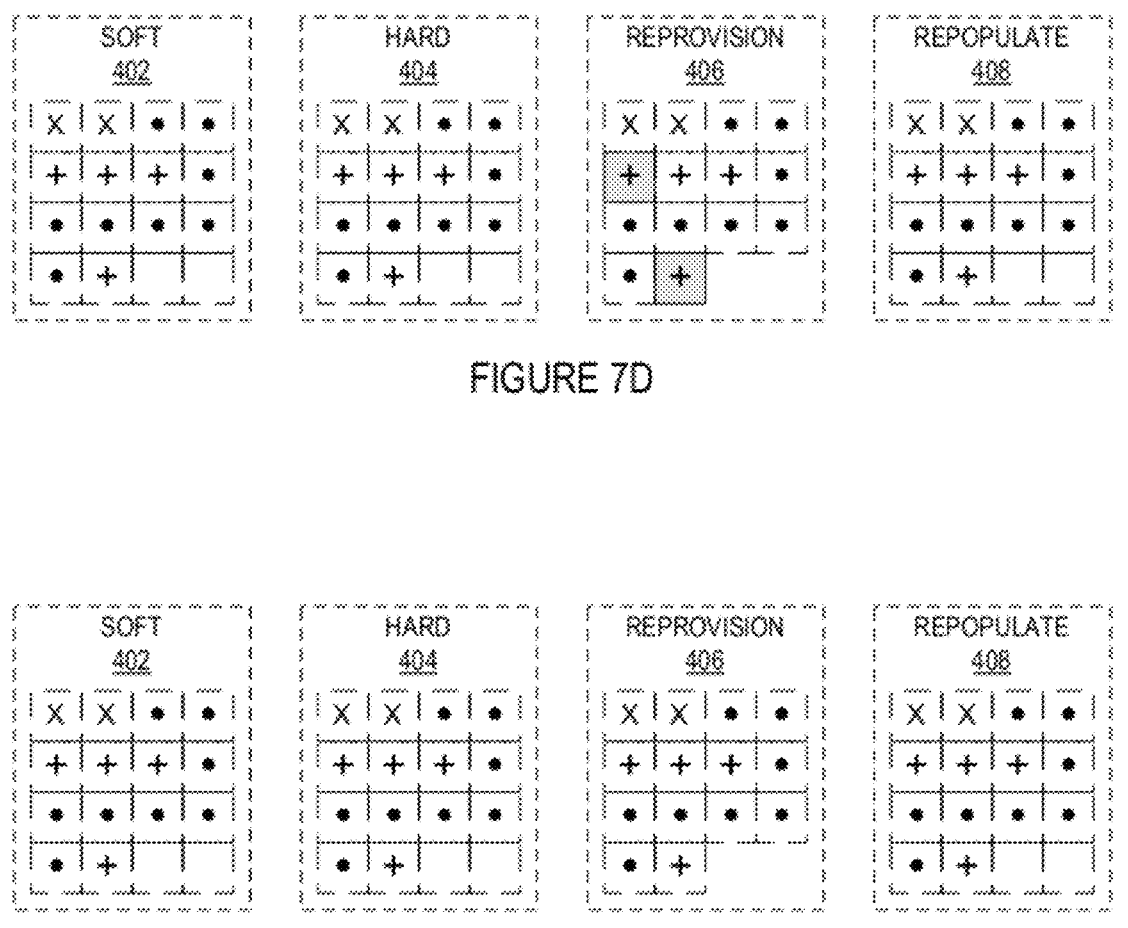

FIG. 7D shows that VMs 3, 4, and 13 are updated next and removed from Reprovision bucket 406 thereafter. Subsequently, VMs 6 and 7 are made available and then users log out of VM 5, making it available again. Meanwhile, users logged into VMs 1 and 2, changing their state to assigned. This leaves four spare VMs and only VMs 5 and 14 need updating FIG. 7E shows that all VMs have been updated to meet the current Habitat specification with the new image file. In this example, a minimum of three spare VMs is again maintained in every stage of the update process, allowing users to log in and out of VMs while the central update process performs incremental updates on them and without invalidating the server concurrency limits.

A habitat has a set of scheduling parameters that enables goal-oriented provisioning. It also has a set of logoff types that determines how a VM is automatically reclaimed after a user logs off. In some embodiments, an administrator can select a logoff type that best balances system responsiveness in making the VM available again, with the guarantees on the consistency of the VM state. These logoff types are made possible by an innovative approach to a VM Lifecycle.

Below describes the lifecycle of a Virtual Machine (VM), from its initial creation and boot-up, through its subsequent assignment to a user to provide a virtual desktop, and then eventually to the reclamation of the VM in order to make it available for other users. In some embodiments, the reclamation is facilitated through the use of VM snapshots at particular points in the VM lifecycle, so that the VM can be rapidly redeployed.

Figure 8:
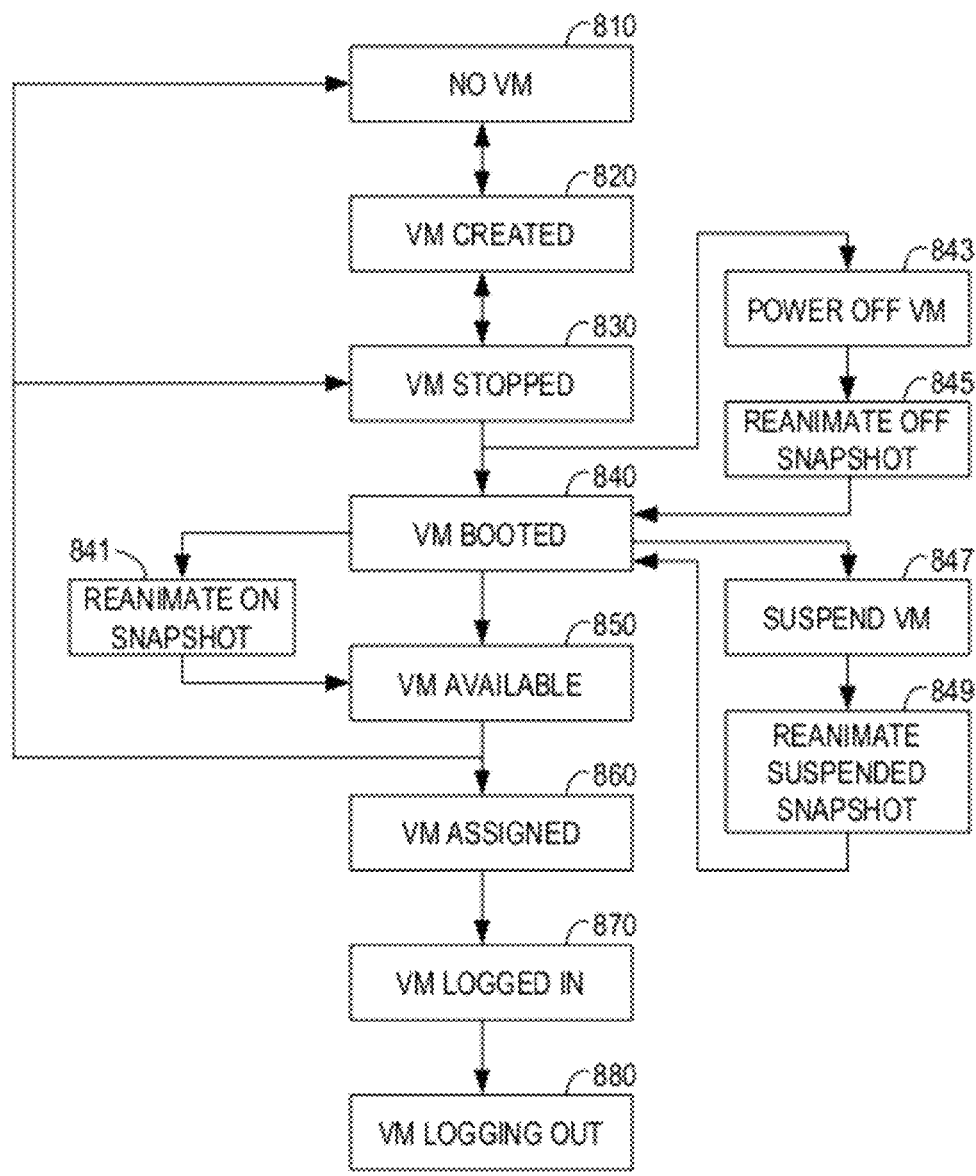
FIGS. 8-9 depict high-level flow diagrams illustrating some example embodiments of a VM lifecycle.
Figure 9:
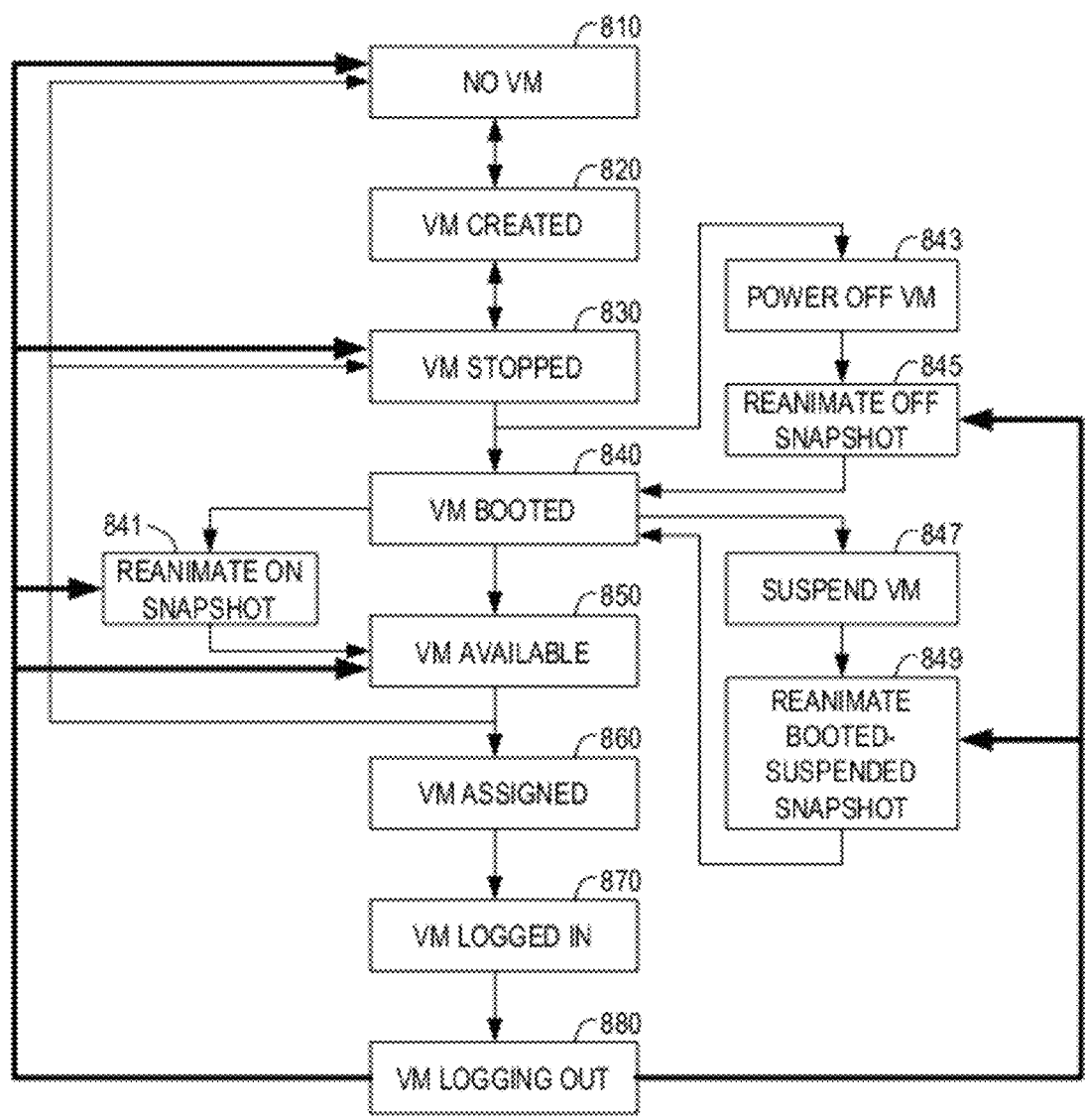

FIGS. 8-9 depict high-level flow diagrams illustrating some example embodiments of VM lifecycle 800. More specifically, FIG. 8 shows different stages in a VM lifecycle, with thin solid lines following a VM as it is created up to being logged off. FIG. 9 shows VM lifecycle 800 with thick solid lines illustrating routes available using various logoff types. FIG. 8 shows one Reinstall and three Reanimate snapshots. FIG. 9 shows that a VM can be reverted to one of these on user logoff.

Each VM in a cluster of servers can be in one of a number of specific states S. At state 810, no VM is created. At state 820, a VM is created. At state 830, a VM "Created" snapshot is taken. At state 840, the VM is booted up. At substate 841, a VM "Booted-On" snapshot is taken. At substate 843, the VM has booted but is off. At substate 845, a VM "Booted-Off" snapshot is taken. At substate 847, the VM is booted and suspended. At substate 849, a VM "Booted-Suspended" snapshot is taken. At state 850, the VM is available. At state 860, the VM is assigned to a user. At state 870, the VM is logged in. At state 880, the VM is logging out.

The transition between these states is achieved through a number of actions, examples of which are listed below:

S810-S820: Create the VM.
The VM is provisioned on the given server.
S820-S830: Take a "Created" Snapshot.
Taking a snapshot at this stage allows the underlying virtualization system to then treat the VM as being independent, even though it might use the same image as other VMs. In some embodiments, using a single copy of the "gold image" is highly desirable for all VMs. Using a single copy saves disk space and reduces I/O and memory usage. However, ESX locks the vmdk for the first active VM, thus preventing the vmdk from being shared at all. The snapshot at this point solves this issue.
S830-S840: Boot Up the VM.
The VM is booted up so that it is able to join the given Windows domain and obtain an IP address and DNS name.
S840-S850: Make the VM Available.
Move the VM into the pool of available VMs to be handed out to users.
S840-S841: Take a "Booted-On" Snapshot.
This snapshot represents a booted VM in its "pristine" condition: unused and ready to be handed to a user. The snapshot will need to also store the memory state of the VM, since it is running, so reverting back to this snapshot has the extra overhead of reinstating the VM memory. However, once this is in place, the VM is ready to use without any further significant paging taking place. Restoring an entire VM's memory will make the VM more responsive when it is initially used but at the expense of intensive disk activity and adding latency before the virtual machine is ready.

S840-S843: Power Off the VM.
This is a pre-processing stage.
S843-S845: Take a "Booted-Off" Snapshot.
At this point, the VM has gone through its booting up stages but is powered down. It can be useful to revert back to this snapshot so that a VM is then able to quickly obtain a new IP address and join the Windows domain, in the case where the server environment has changed. One example of such a change may be adding the definition of a new IP subnet for the VMs.
S845-S840: Power on the VM.
This is a post-processing stage.
S840-S847: Suspend the VM.
This is a pre-processing stage.
S847-S849: Take a "Booted-Suspended" Snapshot.
At this point, the VM is essentially in the same state as S841, in a "pristine" state, but the VM is suspended. This has the benefit that the virtualization system does not have to store the memory state of the VM in the snapshot, so reverting back to this snapshot is much faster. However, after the VM is reverted back, memory pages will need to be paged into the VM over time, as the VM is used. Using suspend/unsuspend smoothes out the I/O usage over time, and the virtual machine becomes available very quickly.
S849-S840: Un-Suspend the VM.
This is a post-processing stage.
S840-S850: Make the VM Available.
Move the VM into the pool of available VMs to be handed out to users.
S850-S830: Power Off the VM.
Revert the VM back to its created but powered off state. This may happen if the system decides that there are too many VMs running and available for users.
S850-S860: User Assigned to the VM.
The VM is handed out to a user.
S860-S870: User Activity.
Network activity is noticed coming into the VM from the user. Remote Desktop Protocol (RDP) traffic may be one example of such a network activity.
S870-S880: User Logs Out, or Times Out Due to Inactivity.
The user either logs out of their desktop or it is noticed that there has been no user activity for a specified amount of time. At this point, a number of alternative logging out actions can be used in order to eventually place a VM back into the pool of available resources. In some embodiments, logoff types may include the following:

Reuse:
No snapshots are taken and the VM is made available again as soon as the user logs off. The availability responsiveness of the Reuse logoff type is initially poor, since it does not use a snapshot approach, but is then immediately usable and available again once the user has logged off. This logoff type has the lowest guarantee on state, since the VM is left in the same state as when the user logged off. It is therefore possible that the VM may have been installed with other apps, infected with a virus, etc.

Reanimate On:
The VM goes through its boot-up stages (rename VM, join Windows domain) and a snapshot is taken. It is slow to take the snapshot and revert back to it, since it needs to maintain the VM's memory, but once reverted its then available and responsive.

Reanimate Off:
As previously, but the VM is turned off before the snapshot. It doesn't have to maintain the memory state, so it's quicker to create and revert back to the snapshot. The availability responsiveness of this logoff type is lower as it need to power on again. However, the guarantee on state is higher since it doesn't suffer the issue by Reanimate On/Suspended that its snapshot will expire and need deleting after a month or so when the Domain Controller changes its user credentials for joining the Windows domain.

Reanimate Suspended:

As previously, but the VM is suspended before the snapshot. It also doesn't have to maintain memory state. The availability of this logoff type is between the Reanimate On/Off logoff types since it has to be additionally resumed from its suspension but doesn't have to be fully powered on. Its usability is lower than the Reanimate On/Off logoff types since once actively used, its memory pages will need to be swapped in as required.

Reinstall:

The snapshot is taken at the stage when the VM is first created, thus the availability responsiveness of this logoff type is low as it needs to go through all its boot-up stages from scratch. But it has a high guarantee on state.

Reprovision:

No snapshot is used and the VM is fully deleted each time.

Examples of these logoff types are illustrated by thick solid lines in FIG. 9. The Reuse and Reprovision logoff types go directly to states 850 and 810.

S880-S810: The VM is Reprovisioned.

The VM is completely destroyed and recreated at some future time. This may be useful if the required specification of the VM changes such that a deletion of the VM is needed. For example, the Windows domain is changed. This corresponds to the "reprovision" type of logout. The VM will also be reprovisioned if it becomes "stuck" and refuses to boot up successfully.

S880-S830: The VM is Powered Off.

The VM is reverted back to its "Created" snapshot described above.

SS880-S841: The VM is Reanimated Using the Snapshot Booted-on.

The VM is reverted back to its "pristine" initial condition, at the "Booted-On" snapshot described above, which guarantees that it is in the same state as when first booted up. The overhead of this may not be completely insignificant, since its memory pages also have to be restored.

S880-S845: The VM is Reanimated Using the Snapshot Booted-Off.

The VM is reverted back to its "Booted-Off" snapshot. As described above, this may be useful if the environment of the server has changed.

S880-S849: The VM is Reanimated Using the Snapshot Booted-Suspended.

The VM is reverted back to its "Booted-Suspended" snapshot described above. This has the advantages of reverting to the "Booted-On" snapshot, but with the extra advantage that the reversion is initially faster, since the snapshot does not need to contain the VM memory state. Subsequent use of the VM will require the memory pages to be loaded. This corresponds to the "reanimate" type of logout.

S880-S850: The VM is Reused.

The VM is not reprovisioned or reverted to a snapshot in any way. Instead, it is simply put back into the pool of available VMs. This corresponds to the "reuse" type of logout.

Table 1 below provides an example of how an administrator might quantitatively select among different logoff types described above, with values 1-5 showing least to best performance. As one skilled in the art can appreciate, these values may vary between platforms. Example platforms may include VMware ESX and Microsoft Hyper-V.

TABLE 1

| Type of Logout | VM snapshot creation | VM availability | VM usability | VM reversion to snapshot | Guarantees on VM state |
|---|---|---|---|---|---|
| Reuse | — | 1 | 5 | 5 | 1 |
| Reanimate Booted On | 1 | 5 | 5 | 1 | 3 |
| Reanimate Booted Off | 3 | 3 | 5 | 4 | 4 |
| Reanimate Booted Suspended | 3 | 4 | 3 | 4 | 3 |
| Reinstall | 4 | 1 | 5 | 5 | 5 |
| Reprovision | — | 1 | 5 | — | 5 |

VM snapshot creation: The responsiveness of creating a snapshot which captures the logoff type.
VM availability: The responsiveness of then going from the snapshot to a VM that is available for new users.
VM usability: The responsiveness of the available VM once it is assigned and starts being used.
VM reversion to snapshot: The responsiveness of reverting back to the logoff type snapshot after the user has logged off.
Guarantees on VM state: The degree of guarantee that a VM is in a pristine state after the VM has reverted according to its logoff type and is made available again.

As Table 1 illustrates, three Reanimate logoff types can support a very fast turnaround time from user logoff to the VM becoming available again. Using this logoff type, together with the image and snapshot files on local disk, some embodiments can support turnaround times of seconds rather than minutes in typical VM systems.

The Reinstall snapshot is always required for VMware ESX using a shared image between VMs, since the independent snapshot gets around the problem of the image being locked per VM. Using a shared image has the advantage of greatly reduced disk space, together with reduced I/O and memory usage. Multiple snapshots can be supported, so the use of a Reinstall snapshot still allows the subsequent use of a Reanimate On snapshot, for example.

The logoff type can be automatically "upgraded" depending on system requirements. For example, if a Reanimate On snapshot has been around for more than a few weeks then reverting to this snapshot might suffer the Domain Controller change in user credentials (mentioned above in the Reanimate Off logoff type). In this case, the logoff type can be automatically upgraded to a Reinstall logoff type and the Reanimate On snapshot discarded.

Embodiments disclosed herein can provide technological advances in many practical applications. For example, in some embodiments, the goal-oriented provisioning approach and the VM lifecycle described above may be utilized to implement on demand desktop virtualization. Within this disclosure, the term "desktop" generally refers to non-server computing devices. Examples of desktop computers may include conventional personal computers, laptops, mobile computing devices, etc. that may be used by end users such as those in User Group 240 in FIG. 2.

Figure 10:
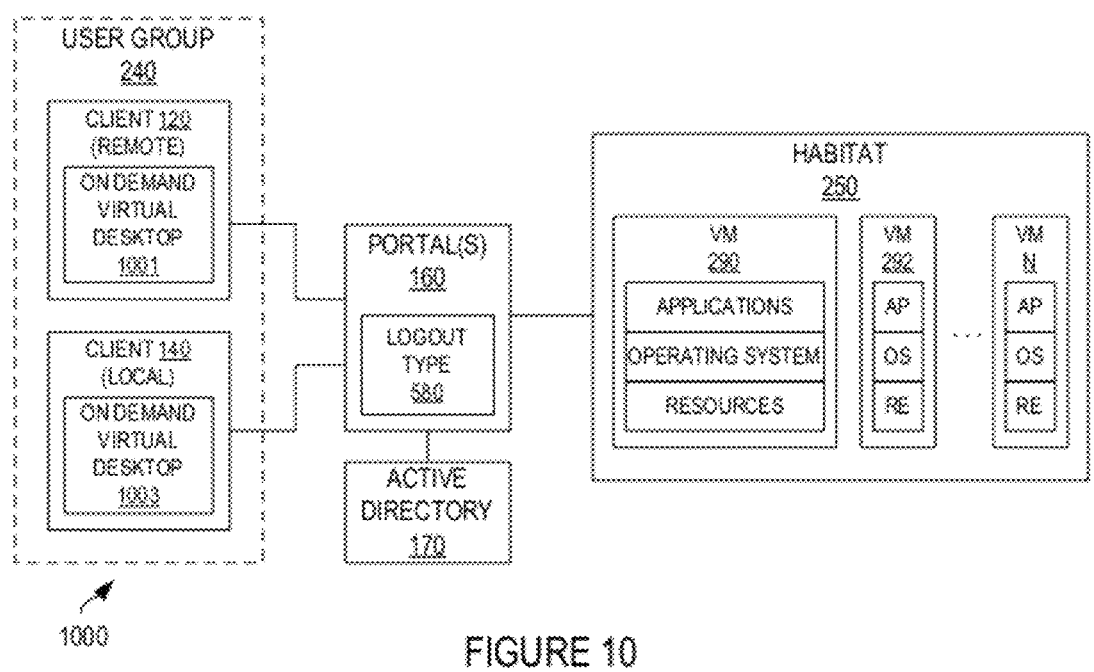
FIG. 10 depicts a high-level block diagram illustrating some example embodiments of a system in which remote client(s) as well as local client(s) can log in and/or out of virtual machines running in Habitat(s) through proprietary portal(s).

FIG. 10 depicts a high-level block diagram illustrating some example embodiments of OnDemand Desktop system 1000 in which users, via remote client 120 as well as local client 140, can Log in and/or out of virtual machines in Habitat 250 through portal 160. As described above, portal 160 may consult active directory 170 for user credentials and support one or more logout types 580 selected by an administrator of system 1000.

In this example, end users at remote client 120 and local client 140 belong to User Group 240 which is supported by VMs in Habitat 250. According to embodiments disclosed herein, VMs in Habitat 250 can be provisioned and reprovisioned without disrupting services provided to end users at remote client 120 and local client 140. In some embodiments, remote client 120 may run a copy of a helper program or thin client On Demand Virtual Desktop 1001 and local client 140 may run a copy of On Demand Virtual Desktop 1003.

Desktop virtualization is similar in concept to server virtualization. Once-separate physical computers are virtualized by extracting the hard drive information, including the operating system image, creating a virtual computer on a centralized server(s), and executing the virtualized image on the virtual computer.

Desktop computers—whether virtualized or not—have several characteristics that are completely unlike server computers:

- They tend to be updated much more frequently with updates and new applications.
- Often, server computers do not experience human interaction. Desktop computers tend to break more often than servers because human operators use them directly. As such, they are more prone to changing to undesirable states such as viruses, accidental updates, etc.
- A single server is likely to house many, many more "virtual desktops" than "virtual servers."
- Coordinating an update to the desktop image and deploying it to a low number of target server computers is relatively simple. Deploying the same update to thousands of target desktop computers is not an easy task.

Embodiments of an OnDemand Desktop system may leverage the innovative approaches, including the goal-oriented provisioning approach and the VM lifecycle with rapid reclamation approach, disclosed herein to allow Information Technology (IT) administrators to quickly and easily create and manage hundreds or thousands of virtual desktop systems according to a Habitat specification specifying the operating system and the associated resource allocations (memory and CPU). In some embodiments, the OnDemand Desktop system is responsible for where (on which server) and when a virtual machine belonging to a Habitat is created, booted up, made available for use, assigned, turned off, and destroyed.

In some embodiments, virtualizing a desktop computer may include extracting the hard drive information, including the operating system image, creating a virtual computer on a centralized server(s), and executing the virtualized image on the virtual computer. More specifically, in some embodiments, the system may perform the following:

Goal-Oriented Provisioning:

The system maintains the specification, or target configuration, for each defined Habitat. Periodically, software implementing a function of the system, referred to herein as the sychron_provision tool, may analyze the state of all the servers and the VMs contained in them. In one embodiment, this analysis is done every six minutes. When and if the Habitat specification is changed, the system will attempt to update out-of-date VMs as quickly as it can while simultaneously follow these rules:

- obeying a set of watermarks governing the minimum and maximum number of VMs powered on and the minimum and maximum number of (unused) VMs ready to assign to a user;
- not overloading a server as a result of creating/powering on/powering off/destroying VMs; and
- not touching VMs that are in use.

If the number of servers or their available capacities change, or the resource allocation for the VMs in the Habitat is updated, the system may determine that a different number (additional or fewer) of VMs is required on one or more servers being managed. Again, the system may automatically create and destroy VMs as needed while obeying the above rules. In this way, the system constantly and automatically strives to bring the operation environment into compliance with the specifications.

VM Lifecycle with Rapid Reclamation:

Embodiments of the system can allow an administrator to select a particular action to take, on a per-Habitat basis, when a user has finished with a virtual desktop. Actions are:

- Reuse—The system simply recycles the virtual machine for immediate reuse by a new user.
- Reinstall—The system powers off the virtual machine by reverting to the created snapshot.
- Reprovision—The system essentially throws away the virtual machine and creates a brand new one that is identical to the gold image available for use.
- Reanimation—The system reverts the virtual machine to a snapshot thereof taken earlier in time. This feature can reduce the reprovisioning time from minutes to seconds.

Serious problems arise with the current approaches others in the industry have taken, depending on the type of logout selected and the nature of the user load. The problems are principally in the area of keeping the number of available virtual machines greater than the number required at any point in time so as to avoid running out of available resources.

If the login rate is high enough, in the cases in which the type of logout is set to reinstall or reprovision, the system will run out of available desktops needed to fulfill the demand. The reprovision logoff type gives users an absolute guarantee that when they login, theirs is a sterile, untouched virtual desktop. In this setting, every time a user is finished with a VM, it is destroyed and recreated. This is a load intensive and time-consuming operation. Conventional VM reprovisioning methods may take tens of minutes or longer for each VM. In some conventional VM systems, an entire physical server may be dedicated to this task. By comparison, in some embodiments of an OnDemand Desktop system disclosed herein, destroying and recreating a VM can take from two to fifteen minutes per operation and can take place on the same server as the rest of the desktop workload.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

The invention claimed is:

1. A method for updating virtual machines, comprising:
at each server machine in a server cluster:
periodically analyzing a local list of virtual machines for a Habitat, wherein the Habitat comprises an image and a specification, wherein the virtual machines are provisioned from the image according to the specification; and
placing all, some, or none of the virtual machines into a plurality of buckets, wherein the plurality of buckets comprises a soft bucket, a hard bucket, a reprovision bucket, and a repopulate bucket;
wherein:
for any virtual machine placed in the soft bucket, a parameter of the virtual machine can be updated while the virtual machine is running;

for any virtual machine placed in the hard bucket, the virtual machine needs to be stopped before the parameter is to be updated;
for any virtual machine placed in the reprovision bucket, the virtual machine must be deleted and recreated; and
a virtual machine is placed in the repopulate bucket if the server machine decides to delete this virtual machine; and
processing the plurality of buckets per server machine in the server cluster to incrementally update any virtual machine placed therein, subject to a server concurrency limit and scheduling parameters of the specification.

2. The method according to claim 1, wherein each of the virtual machines is in an available, assigned, or stopped state, wherein the processing is performed by a central update process, and wherein the processing comprises in the following order;
if no virtual machines are in the plurality of buckets and a change in the specification indicates that more virtual machines can be supported on the server machine, creating one or more virtual machines for the server machine;
deleting any virtual machine that is stopped and that is in the repopulate bucket;
updating any virtual machine that is stopped and that is in the reprovision bucket;
updating any virtual machine that is stopped and that is in the hard bucket;
updating any virtual machine that is available and that is in the repopulate bucket;
updating any virtual machine that is available and that is in the reprovision bucket;
updating any virtual machine that is available and that is in the hard bucket; and
updating any virtual machine that is in the soft bucket.

3. The method according to claim 2, wherein the central update process periodically runs within the server cluster or on a device having access to the server cluster.

4. The method according to claim 1, wherein the server concurrency limit specifies a maximum number of updates allowed by the server machine to be performed on the virtual machines at any time.

5. The method according to claim 1, wherein the scheduling parameters include a minimum number of spare virtual machines available to end users.

6. The method according to claim 1, wherein at least one of the virtual machines is simultaneously placed in the soft bucket and the hard bucket for different types of updates.

7. The method according to claim 6, wherein the different types of updates include a memory update and a processing power update.

8. The method according to claim 1, wherein all the virtual machines are placed in the reprovision bucket for an image update.

9. A computer program product comprising at least one non-transitory computer readable medium storing computer instructions translatable by at least one processor to perform, in a server cluster:
periodically analyzing a list of virtual machines for a Habitat, wherein the Habitat comprises an image and a specification, wherein the virtual machines are provisioned from the image according to the specification; and
placing all, some, or none of the virtual machines into a plurality of buckets, wherein the plurality of buckets comprises a soft bucket, a hard bucket, a reprovision bucket, and a repopulate bucket;
wherein:
for any virtual machine placed in the soft bucket, a parameter of the virtual machine can be updated while the virtual machine is running;
for any virtual machine placed in the hard bucket, the virtual machine needs to be stopped before the parameter is to be updated;
for any virtual machine placed in the reprovision bucket, the virtual machine must be deleted and recreated; and
a virtual machine is placed in the repopulate bucket if the server machine decides to delete this virtual machine; and
processing the plurality of buckets per server machine in the server cluster to incrementally update any virtual machine placed therein, subject to a server concurrency limit and scheduling parameters of the specification.

10. The computer program product of claim 9, wherein each of the virtual machines is in an available, assigned, or stopped state, and wherein the processing comprises:
if no virtual machines are in the plurality of buckets and a change in the specification indicates that more virtual machines can be supported on the server machine, creating one or more virtual machines for the server machine;
deleting any virtual machine that is stopped and that is in the repopulate bucket;
updating any virtual machine that is stopped and that is in the reprovision bucket;
updating any virtual machine that is stopped and that is in the hard bucket;
updating any virtual machine that is available and that is in the repopulate bucket;
updating any virtual machine that is available and that is in the reprovision bucket;
updating any virtual machine that is available and that is in the hard bucket; and
updating any virtual machine that is in the soft bucket.

11. The computer program product of claim 9, wherein the placing comprises placing at least one of the virtual machines simultaneously in the soft bucket and in the hard bucket for different types of updates.

12. The computer program product of claim 11, wherein the different types of updates include a memory update and a processing power update.

13. The computer program product of claim 9, wherein the placing comprises placing all the virtual machines in the reprovision bucket for an image update.

14. A system, comprising:
at least one portal connected to an active directory;
a plurality of client computers coupled to the at least one portal over a network;
one or more server clusters coupled to the at least one portal over the network, wherein each server cluster comprises one or more server machines, wherein
each server machine in a server cluster is operable to
periodically analyze a local list of virtual machines for a Habitat, wherein the Habitat comprises an image and a specification, wherein the virtual machines are provisioned from the image according to the specification; and
place all, some, or none of the virtual machines into a plurality of buckets, wherein the plurality of buckets comprises a soft bucket, a hard bucket, a reprovision bucket, and a repopulate bucket;

wherein:
for any virtual machine placed in the soft bucket, a parameter of the virtual machine can be updated while the virtual machine is running;
for any virtual machine placed in the hard bucket, the virtual machine needs to be stopped before the parameter is to be updated;
for any virtual machine placed in the reprovision bucket, the virtual machine must be deleted and recreated; and
a virtual machine is placed in the repopulate bucket if the server machine decides to delete this virtual machine; and
a central update process running within the server cluster or on a device having access to the server cluster, wherein the central update process is operable to process the plurality of buckets per server machine in the server cluster to incrementally update any virtual machine placed therein, subject to a server concurrency limit and scheduling parameters of the specification.

15. The system of claim 14, wherein each of the virtual machines is in an available, assigned, or stopped state, wherein the central update process is further operable to perform:
if no virtual machines are in the plurality of buckets and a change in the specification indicates that more virtual machines can be supported on the server machine, creating one or more virtual machines for the server machine;
deleting any virtual machine that is stopped and that is in the repopulate bucket;
updating any virtual machine that is stopped and that is in the reprovision bucket;
updating any virtual machine that is stopped and that is in the hard bucket;
updating any virtual machine that is available and that is in the repopulate bucket;
updating any virtual machine that is available and that is in the reprovision bucket;
updating any virtual machine that is available and that is in the hard bucket; and
updating any virtual machine that is in the soft bucket.

16. The system of claim 14, wherein the server concurrency limit specifies a maximum number of updates allowed by the server machine to be performed on the virtual machines at any time.

17. The system of claim 14, wherein the scheduling parameters include a minimum number of spare virtual machines available to end users.

18. The system of claim 14, wherein at least one of the virtual machines is simultaneously placed in the soft bucket and the hard bucket for different types of updates.

19. The system of claim 18, wherein the different types of updates include a memory update and a processing power update.

20. The system of claim 14, wherein all the virtual machines are placed in the reprovision bucket for an image update.

* * * * *